United States Patent
Gomi et al.

(10) Patent No.: US 7,359,567 B2
(45) Date of Patent: Apr. 15, 2008

(54) SIGNAL PROCESSING APPARATUS FOR ELIMINATING RINGING SIGNAL AND METHOD THEREOF, RECORD MEDIUM, AND PROGRAM

(75) Inventors: Shinichiro Gomi, Chiba (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 10/758,121

(22) Filed: Jan. 16, 2004

(65) Prior Publication Data
US 2004/0201722 A1 Oct. 14, 2004

(30) Foreign Application Priority Data
Jan. 31, 2003 (JP) .............................. 2003-024714

(51) Int. Cl.
G06K 9/40 (2006.01)
G06K 9/44 (2006.01)
G06K 9/56 (2006.01)
G06K 9/60 (2006.01)

(52) U.S. Cl. ...................... 382/266; 382/257; 382/260; 382/263; 382/308; 348/252

(58) Field of Classification Search ............. 348/229.1, 348/252, 255; 382/260–264, 266, 268, 308
See application file for complete search history.

(56) References Cited
U.S. PATENT DOCUMENTS

| | | | |
|---|---|---|---|
| 6,072,538 A * | 6/2000 | Keating ...................... | 348/625 |
| 6,404,936 B1 * | 6/2002 | Katayama et al. .......... | 382/283 |
| 6,937,277 B1 * | 8/2005 | Hattori et al. ............... | 348/304 |
| 6,950,561 B2 * | 9/2005 | Boroczky et al. ........... | 382/263 |
| 7,057,636 B1 * | 6/2006 | Cohen-Solal et al. ..... | 348/14.08 |
| 2001/0048474 A1 * | 12/2001 | Yamazaki et al. .......... | 348/207 |

\* cited by examiner

Primary Examiner—Ngoc-Yen Vu
Assistant Examiner—Albert H Cutler
(74) Attorney, Agent, or Firm—Oblon, Spivak, McClelland, Maier & Neustadt, P.C.

(57) ABSTRACT

Image quality degrading components can be eliminated from a contour correction signal of high frequency region that is used for contour correction. A filtering section extracts a high frequency region signal from a signal inputted from a VLPF. A mask generating section generates a mask by masking image quality degrading components (e.g., ringing components) contained in the extracted signal. A gain factor generating section generates a gain factor that eliminates image quality degrading components on the basis of the mask. A multiplier multiplies the extracted signal by the gain factor, and outputs an adder a resultant signal (horizontal contour correction signal free from the image quality degrading components). Since the horizontal contour correction signal is generated by eliminating the image quality degrading components from the high frequency region signal, the occurrence of ringing and the like can be suppressed to ensure excellent image quality.

5 Claims, 22 Drawing Sheets

BACKGROUND ART

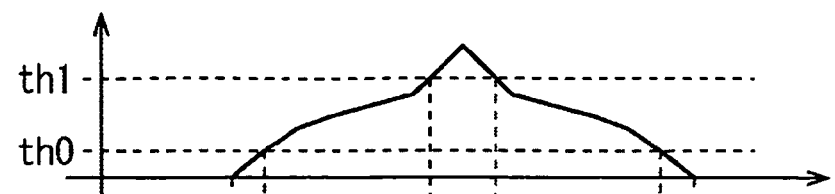
FIG.20A
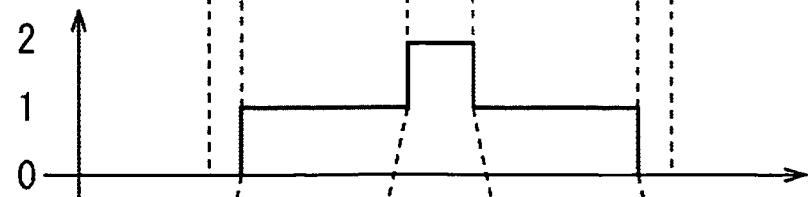
FIG.20B
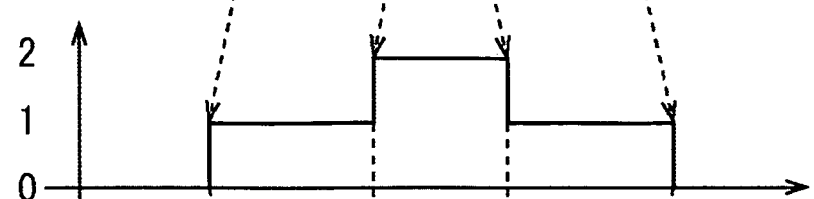
FIG.20C
FIG.20D
FIG.20E
FIG.20F
FIG.20G

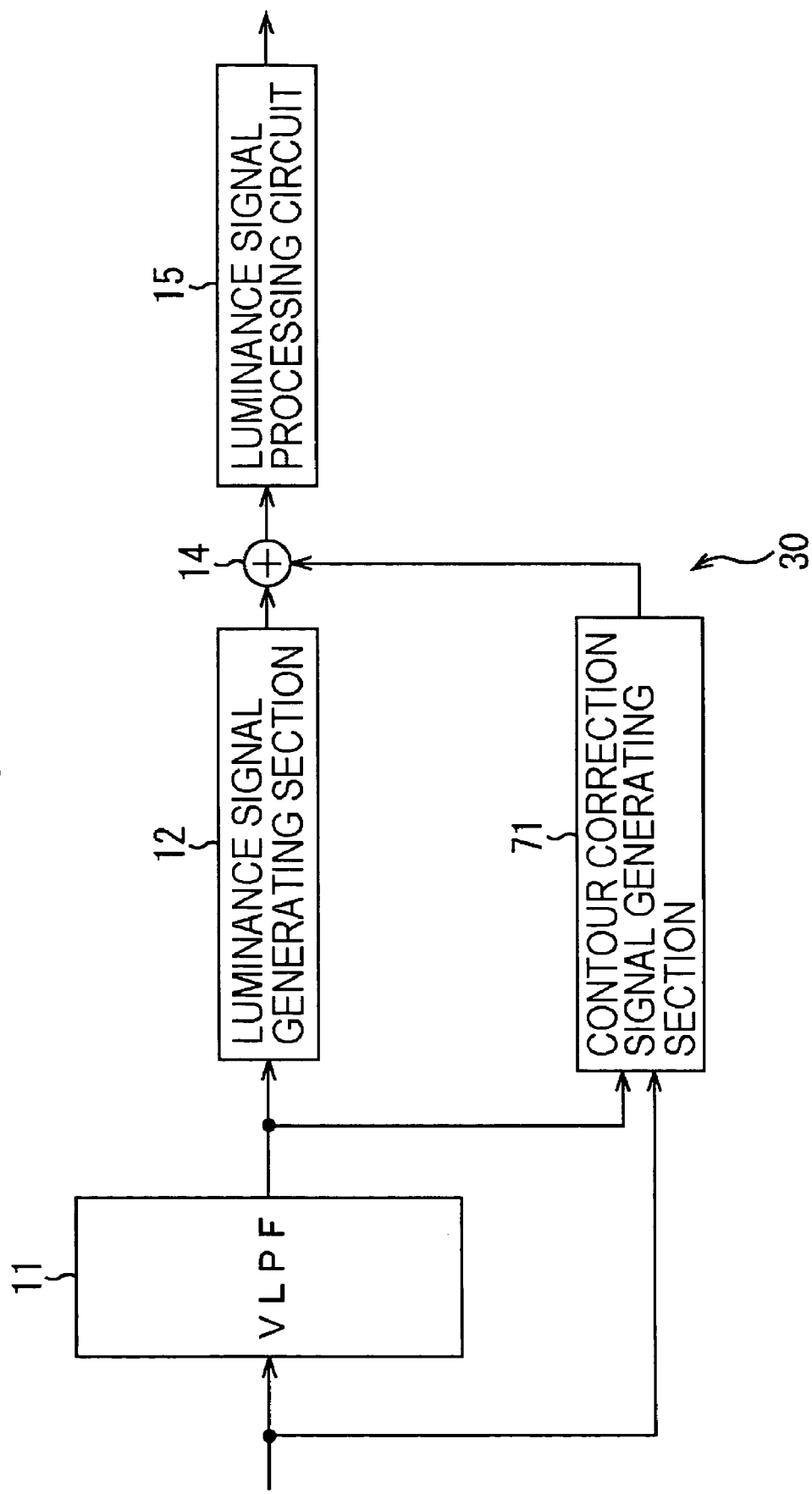

FIG.25

| P(j−1, i) | P(j, i) | P(j+1, i) |
|---|---|---|

FIG.26

| DR(j−1, i) | DR(j, i) | DR(j+1, i) |
|---|---|---|

| P(j, i−1) | P(j+1, i−1) | P(j+2, i−1) |
|---|---|---|
| P(j, i) | P(j+1, i) | P(j+2, i) |
| P(j, i+1) | P(j+1, i+1) | P(j+2, i+1) |

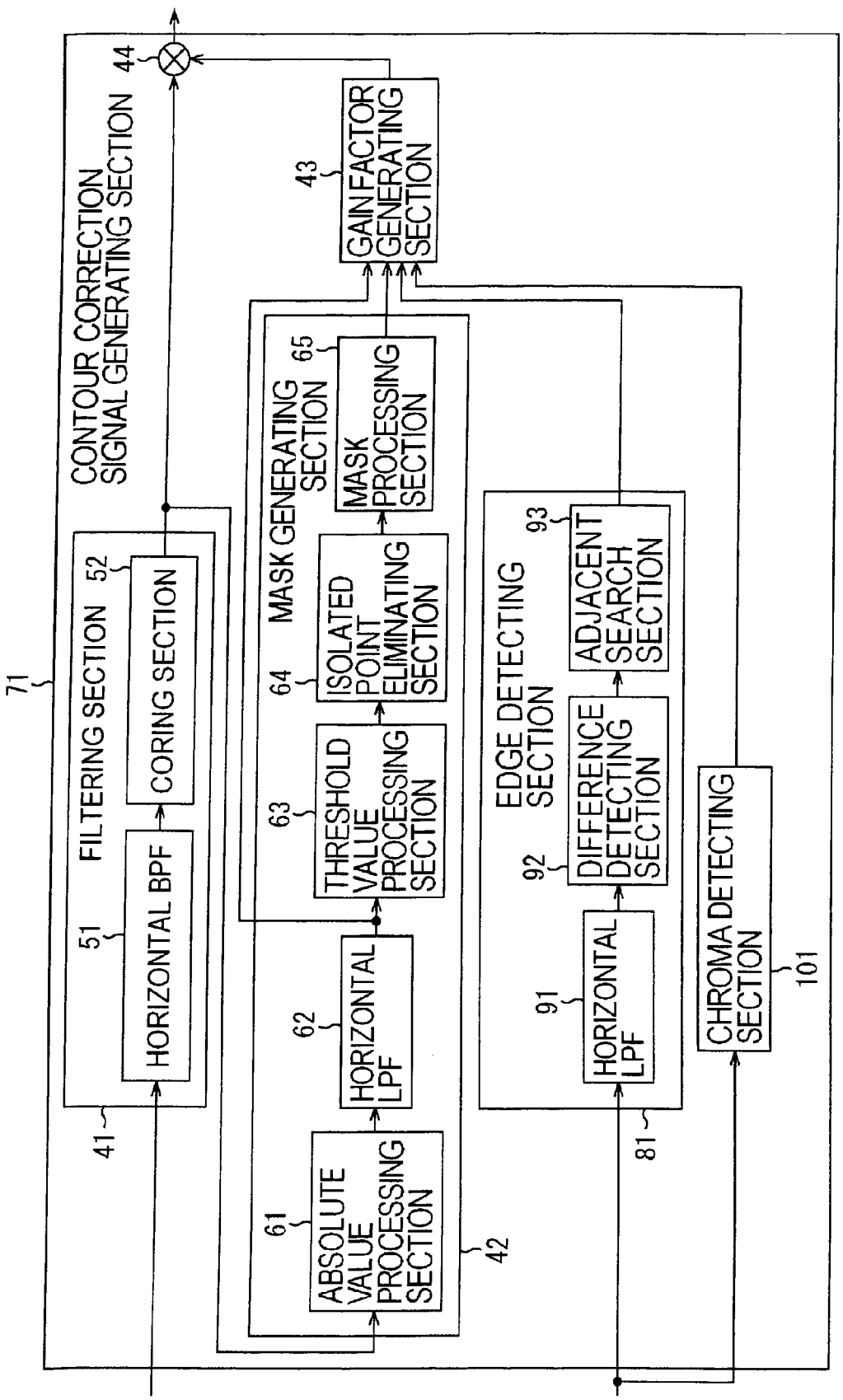

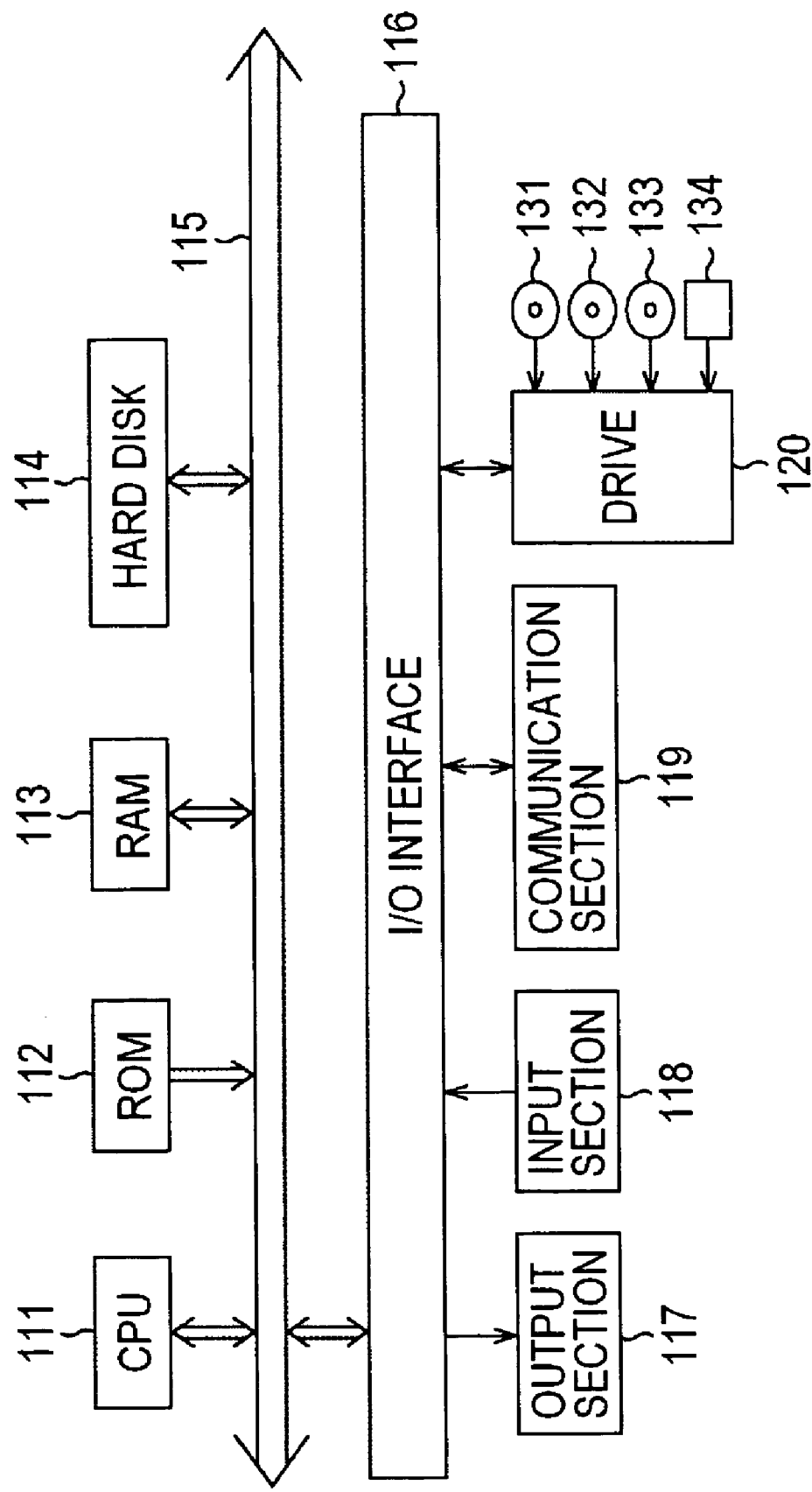

SIGNAL PROCESSING APPARATUS FOR ELIMINATING RINGING SIGNAL AND METHOD THEREOF, RECORD MEDIUM, AND PROGRAM

CROSS REFERENCE TO RELATED APPLICATION

This application claims priority from Japanese Priority Document No. 2003-024714, filed on Jan. 31, 2003 with the Japanese Patent Office, which document is hereby incorporated by reference.

BACKGROUND OF THE INVENTION

1. Field of the Invention

The present invention relates to a signal processing apparatus and a method, a record medium and a program. More particularly, the invention relates to a signal processing apparatus and a method, a record medium and a program with which it is capable of eliminating properly a ringing component from a contour correction signal.

2. Description of Related Art

FIG. 1 shows the configuration of a signal processing apparatus 1 that processes a video signal from a conventional CCD (charge coupled device) camera, which is discussed in, for example, "Introduction to CCD Camera Technique" by Hiroo Takemura, Corona Publishing Co., Ltd., pp. 144-145.

A VLPF (vertical low pass filter) 11 performs vertical low pass filtering processing of a video signal (hereinafter referred to as an input video signal) from a CCD camera (not shown), and outputs a resultant signal to a luminance signal generating section 12 and a contour correction signal generating section 13.

The luminance signal generating section 12 includes, for example, a horizontal LPF and the like, and generates from the signal inputted from the VLPF 11 a horizontal luminance signal having frequency characteristics as indicated by a dotted line A in FIG. 2.

The contour correction signal generating section 13 generates from the signal inputted from the VLPF 11 a horizontal contour correction signal (a high frequency region signal) having frequency characteristics as indicated by a solid line B in FIG. 2, and then outputs this correction signal to an adder 14.

FIG. 3 shows an example of the configuration of the contour correction signal generating section 13.

The signal from the VLPF 11 is inputted to a delay circuit 21 and an adding circuit 23. The delay circuit 21 delays the inputted signal for an arbitrary time τ, and then outputs a resultant signal to a delay circuit 22 and a subtracting circuit 25.

The delay circuit 22 further delays the signal inputted from the delay circuit 21 for the time τ and then outputs a resultant signal to the adding circuit 23.

The adding circuit 23 adds the signal from the VLPF 11 and the signal from the delay circuit 22, and then outputs a resultant signal to a dividing circuit 24.

The dividing circuit 24 divides the signal inputted from the adding circuit 23 into halves, and then outputs a resultant signal to the subtracting circuit 25. The subtracting circuit 25 subtracts the signal inputted from the dividing circuit 24 from the signal inputted from the delay circuit 21, and then outputs a resultant signal to the adder 14 (FIG. 1), as a horizontal contour correction signal.

In the adder 14, a luminance signal from the luminance signal generating section 12 and a horizontal contour correction signal from the contour correction signal generating section 13 are added, and a resultant signal (luminance signal) is then outputted to the luminance signal processing circuit 15.

By adding the horizontal contour correction signal of high frequency region to the luminance signal as described above, the luminance signal once falls temporarily at the time of rise, and then rises, and returns after exceeding a predetermined level, so that it is able to improve sharpness of the entire image.

The luminance signal processing circuit 15 performs processing, such as adding a synchronizing signal and a blanking signal to the luminance signal inputted from the adder 14.

However, the horizontal contour correction signal generated by the conventional contour correction generating section 13 (FIG. 3) contains image quality degrading components without change (ringing components and the like), as indicated by dotted circles R in FIG. 4. The conventional manner of correcting a luminance signal by a contour correction signal suffers from the problem that ringing occurs in an edge peripheral portion, or aliasing occurs, thus degrading image quality.

Therefore, there is a need for eliminating such image quality degrading components from a contour correction signal of high frequency region thereby to suppress image quality degradation due to ringing and the like.

SUMMARY OF THE INVENTION

A signal processing apparatus of the present invention includes: means for generating a luminance signal of an input video signal; means for extracting a high frequency signal from the input video signal; mask generating means for generating a mask by masking image quality degrading components contained in the high frequency signal; gain factor generating means for generating a gain factor on the basis of the mask; contour correction signal generating means for generating a contour correction signal by multiplying the high frequency signal with the gain factor; and correcting means for correcting the luminance signal on the basis of the contour correction signal.

The mask generating means can generate the mask by repeating an arbitrary number of times dilation processing or erosion processing for the high frequency signal.

There is further provided with detecting means that detects either or both of an edge component and chroma component from an input video signal. The gain factor generating means can generate a gain factor that is based on the mask and controls the enhanced amount of either or both of the edge component and chroma component.

A signal processing method of the present invention includes the steps of: generating a luminance signal of an input video signal; extracting a high frequency signal from the input video signal; generating a mask by masking image quality degrading components contained in the high frequency signal; generating a gain factor on the basis of the mask; generating a contour correction signal by multiplying the high frequency signal by the gain factor; and correcting the luminance signal on the basis of the contour correction signal.

A record medium of the present invention includes stored computer program that comprises the steps of generating a mask by masking image quality degrading components contained in a high frequency signal extracted from an input video signal; generating a gain factor on the basis of the mask; generating a contour correction signal by multiplying the high frequency signal by the gain factor; and correcting a luminance signal of the input video signal on the basis of the contour correction signal.

A program of the present invention has a computer execute processing including the steps of generating a mask by masking an image quality degrading component contained in a high frequency signal extracted from an input video signal; generating a gain factor on the basis of the mask; generating a contour correction signal by multiplying the high frequency signal by the gain factor; and correcting a luminance signal of the input video signal on the basis of the contour correction signal.

In the signal processing apparatus and method, the record medium and the program of the present invention, a luminance signal of an input video signal is generated, and a high frequency signal is extracted from the input video signal. A mask is generated by masking image quality degrading components contained in the high frequency signal. A gain factor is generated on the basis of the mask. A contour correction signal is generated by multiplying the high frequency signal by the gain factor. The luminance signal is corrected on the basis of the contour correction signal.

In accordance with the present invention, it is capable of eliminating properly image quality degrading components from a contour correction signal.

BRIEF DESCRIPTION OF THE DRAWINGS

FIG. 20 is a diagram showing an output waveform of a threshold value processing section through the mask processing section in FIG. 6;

FIG. 23 is a block diagram showing another example of the configuration of the signal processing apparatus of the present invention;

FIG. 25 is a diagram illustrating difference detecting processing;

FIG. 26 is a diagram illustrating adjacent search processing;

FIG. 30 is a block diagram showing another example of the configuration of the contour correction signal generating section in FIG. 23; and FIG. 31 is a block diagram showing an example of the configuration of a personal computer.

DETAILED DESCRIPTION OF THE PREFERRED EMBODIMENTS

Figure 1:
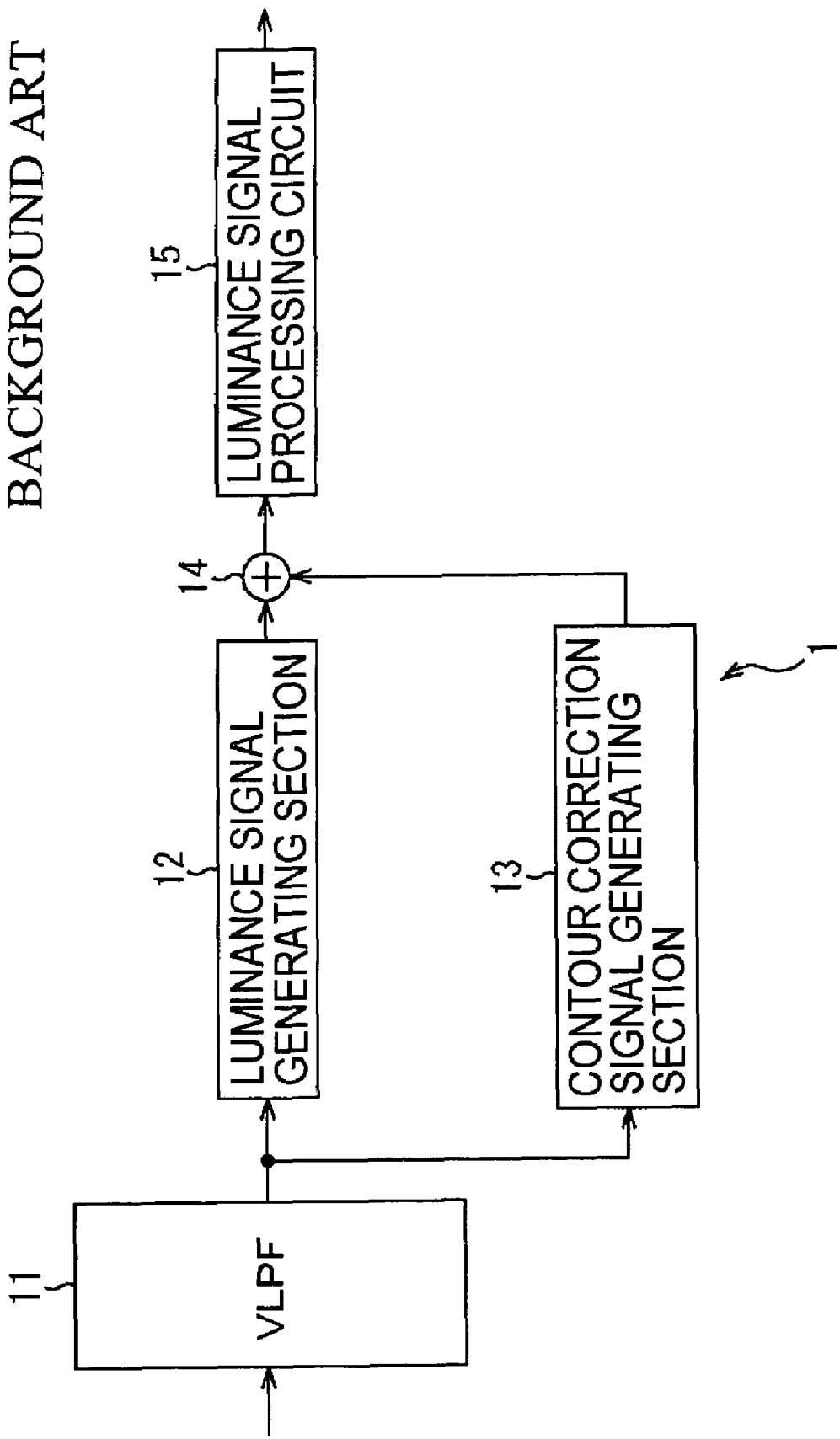
FIG. 1 is a block diagram showing an example of the configuration of a conventional signal processing apparatus.
Figure 2:
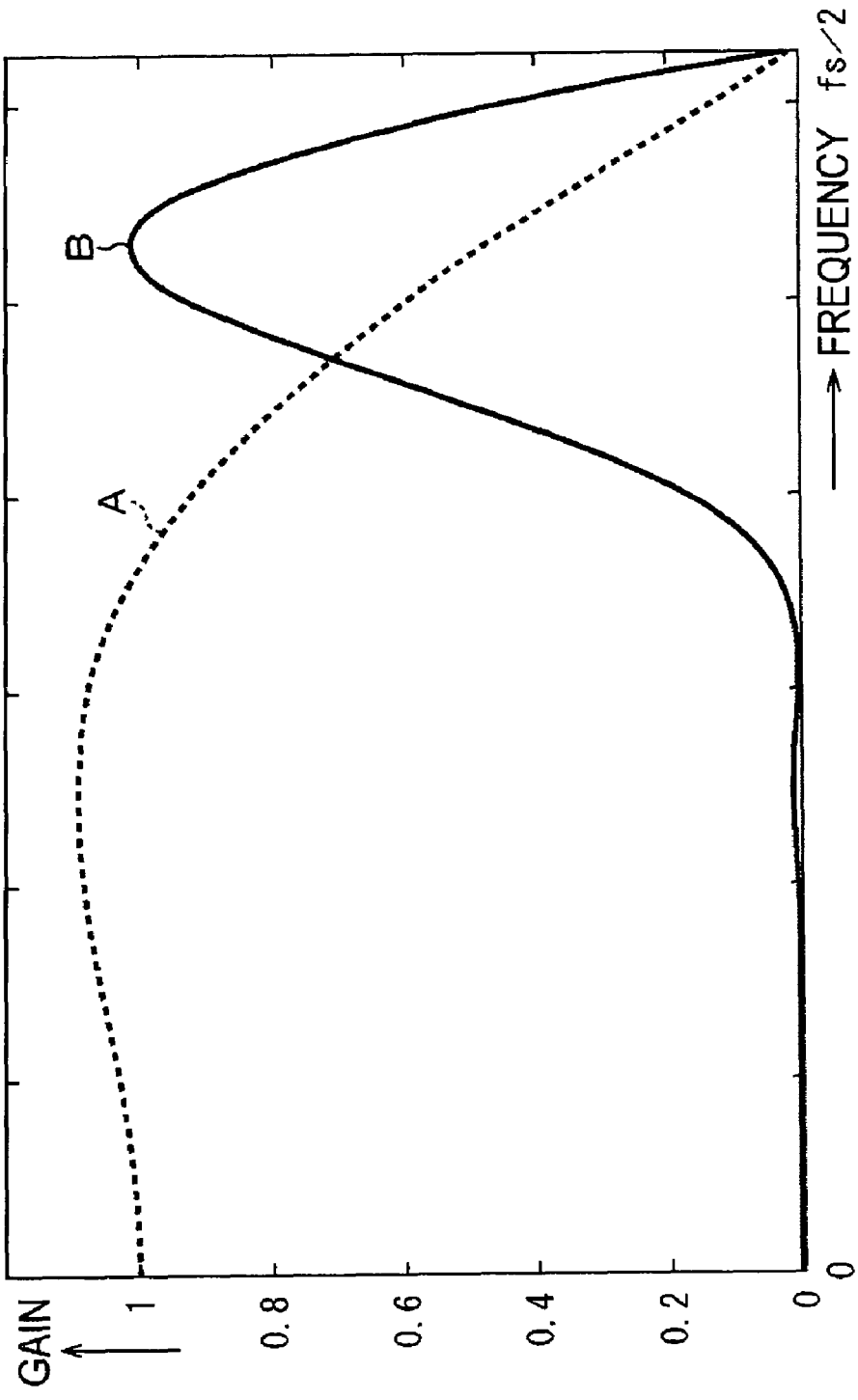
FIG. 2 is a diagram showing frequency characteristics of a luminance signal and a contour correction signal.
Figure 3:
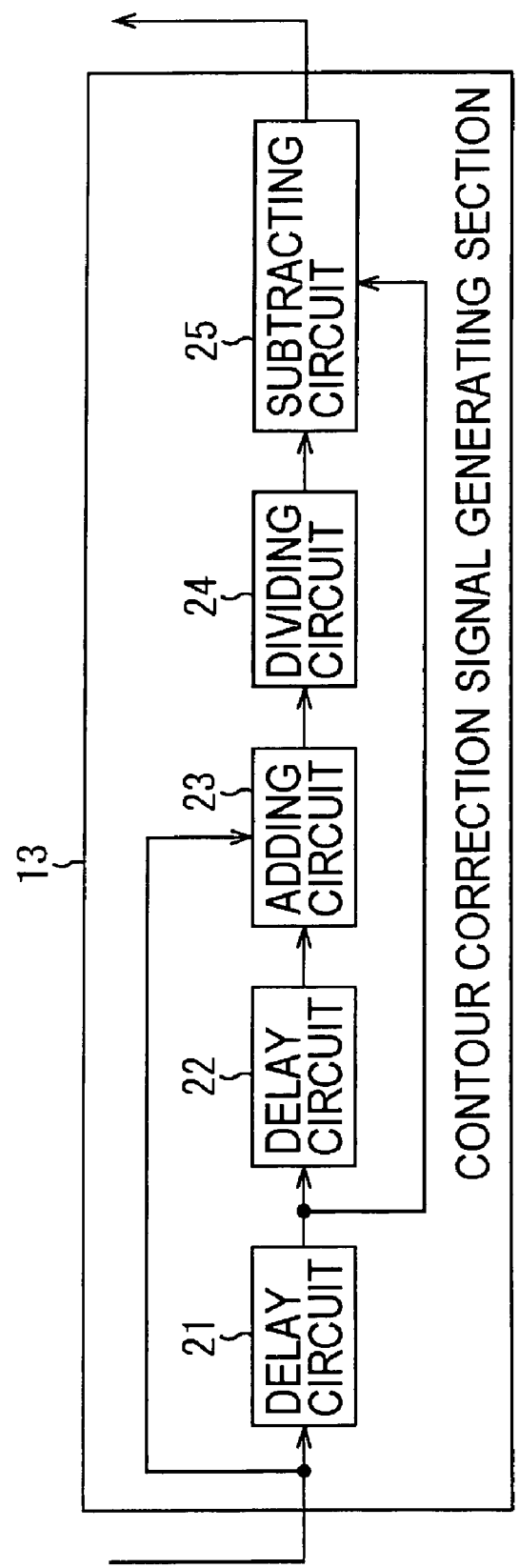
FIG. 3 is a block diagram showing an example of the configuration of a contour correction signal generating section in FIG. 1.
Figure 4:
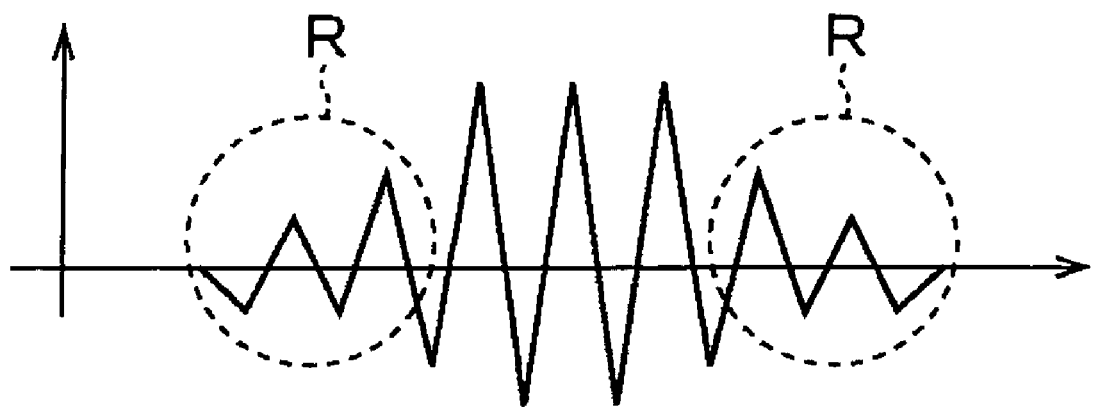
FIG. 4 is a diagram showing a waveform of a conventional horizontal contour correction signal.
Figure 5:
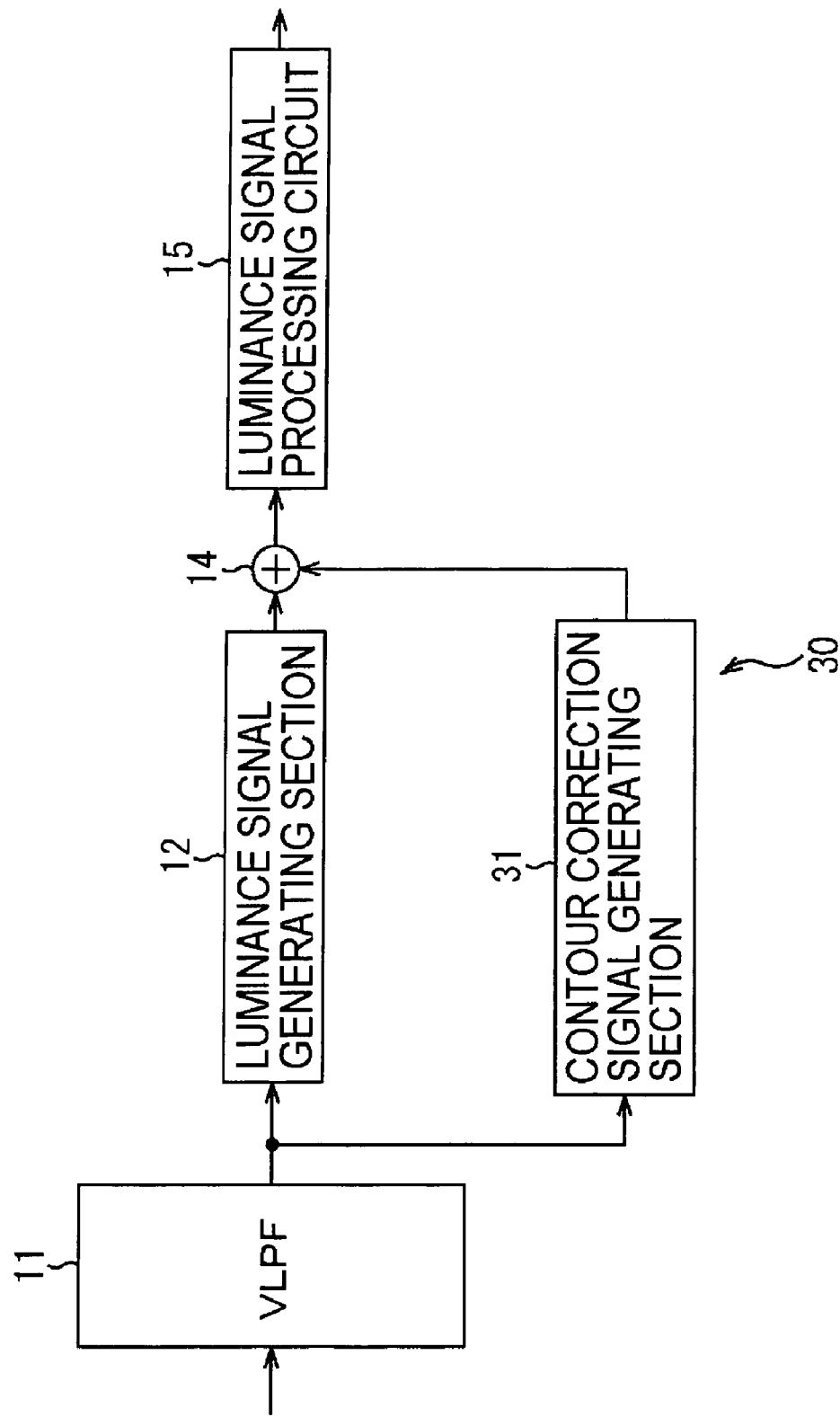
FIG. 5 is a block diagram showing an example of the configuration a signal processing apparatus to which the present invention is applied.

FIG. 5 shows an example of the configuration of a signal processing apparatus 30 to which the present invention is applied. The signal processing apparatus 30 is provided with a contour correction signal generating section 31 in place of the contour correction signal generating section 13 of the conventional signal processing apparatus 1 in FIG. 1. Otherwise, the apparatus 30 is identical to the apparatus 1 in FIG. 1, and therefore its description is omitted herein.

Figure 6:
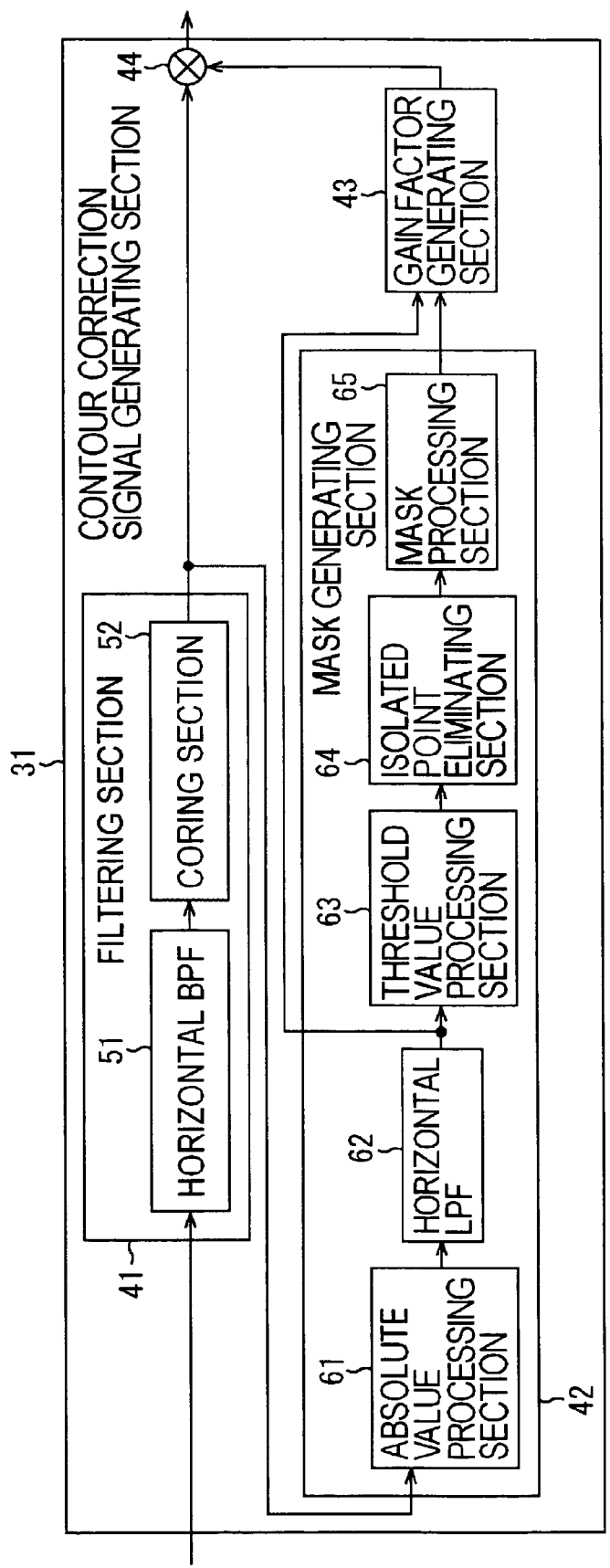
FIG. 6 is a block diagram showing an example of the configuration of the contour correction signal generating section in FIG. 5.

FIG. 6 shows an example of the configuration of the contour correction signal generating section 31.

A filtering section 41 extracts a high frequency region signal from a signal inputted from a VLPF 11 (FIG. 5), and then outputs it to a mask generating section 42 and a multiplier 44.

The mask generating section 42 generates a mask by masking image quality degrading components (ringing components and the like) contained in the high frequency region signal extracted by the filtering section 41, and then outputs the mask to a gain factor generating section 43.

On the basis of the mask generated by the mask generating section 42, the gain factor generating section 43 generates a gain factor (gain factor C3) for eliminating image quality degrading components and then outputs the gain factor C3 to the multiplier 44.

The multiplier 44 multiplies the high frequency region signal extracted by the filtering section 41 by the gain factor C3 supplied from the gain factor generating section 43, and then outputs a resultant signal (a horizontal contour correction signal which is free from the image quality degrading components) to an adder 14 (FIG. 5).

That is, according to the signal processing apparatus 30, the horizontal contour correction signal is generated by eliminating the image. quality degrading components from the high frequency region signal. This enables to improve sharpness of the entire image and also ensures excellent image quality while suppressing the occurrence of ringing and the like.

The following is a detail description of the filtering section 41. The filtering section 41 consists of a horizontal BPF (band pass filter) 51 and a coring section 52. Their operations will be described below.

The horizontal BPF 51 performs horizontal band-pass filtering processing of a signal from the VLPF 11, and then outputs a resultant signal to the coring section 52. In this case, the filtering factors of the horizontal BPF 51 are, for example, 0.0125, −0.0625, 0.1375, −0.1875, 0.175, −0.075, 0.175, −0.1875, 0.1375, −0.0625, and 0.0125.

Figure 7:
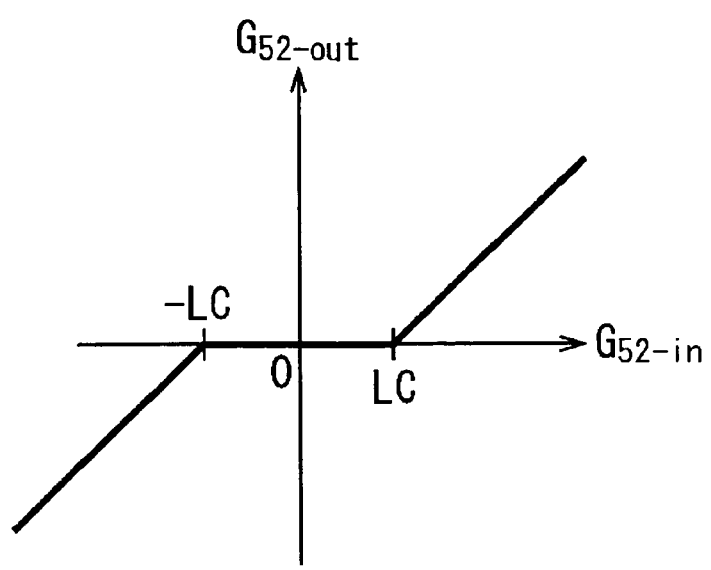
FIG. 7 is a diagram illustrating coring processing.

The coring section 52 performs coring processing based on the following relationships between input and output with respect to a signal (signal G52-in) inputted from the horizontal BPF 51, and then outputs a resultant signal (signal G52-out) to the mask generating section 42. FIG. 7 shows the relationships between input and output.

$G52\text{-out}=G52\text{-in}+LC$, when $G52\text{-in}<-LC$ $G52\text{-out}=0$, when $-LC \leq LC$ $G52\text{-out}=G52\text{-in}-LC$, when $G52\text{-in}>LC$ Thus, by the band-pass filtering processing and coring processing of the signal from the VLPF 11, a high frequency region signal is extracted and inputted to the mask generating section 42.

The following is a detail description of the mask generating section 42 (the operation thereof will also be described later). An absolute value processing section 61 obtains the absolute value of the high frequency region signal from the filtering section 41, and then outputs it to a horizontal LPF 62. The horizontal LPF 62 performs horizontal low pass filtering processing of the absolute value signal from the absolute value processing section 61, and then outputs a resultant signal to a threshold value processing section 63 and the gain factor generating section 43. The filtering factors of the horizontal LPF 62 are, for example, 0.25, 0.5, and 0.25.

With use of four threshold values th0 to th3, the threshold value processing section 63 converts the signal (signal G63-in) inputted from the horizontal LPF 62 to, for example, an index signal (signal G63-out) made up of five stages of value 0 to value 4, as described below.

$G63\text{-out}=0$, when $G63\text{-in}<\text{th0}$ $G63\text{-out}=1$, when $\text{th0} \leq G63\text{-in}<\text{th1}$ $G63\text{-out}=2$, when $\text{th1} \leq G63\text{-in}<\text{th2}$ $G63\text{-out}=3$, when $\text{th2} \leq G63\text{-in}<\text{th3}$ $G63\text{-out}=4$, when $\text{th3} \leq G63\text{-in}$ The isolated point eliminating section 64 performs isolated point eliminating processing of the index signal inputted from the threshold value processing section 63, and then outputs a resultant signal to a mask processing section 65.

Specifically, the isolated point eliminating section 64 converts the index of a target pixel to value 0, when all the indexes of pixels in a predetermined positional relationship relative to the target pixel (i.e., peripheral pixels) have value 0. The isolated point eliminating section 64 also converts the index of the target pixel to a maximum value in the indexes of peripheral pixels, when all the indexes of the peripheral pixels have a value other than value 0. In the cases other than that (if there is one or more indexes having value 0, although all the indexes of peripheral pixels do not have value 0), the isolated point eliminating section 64 leaves the index of a target pixel as it is, without converting.

Figure 8:
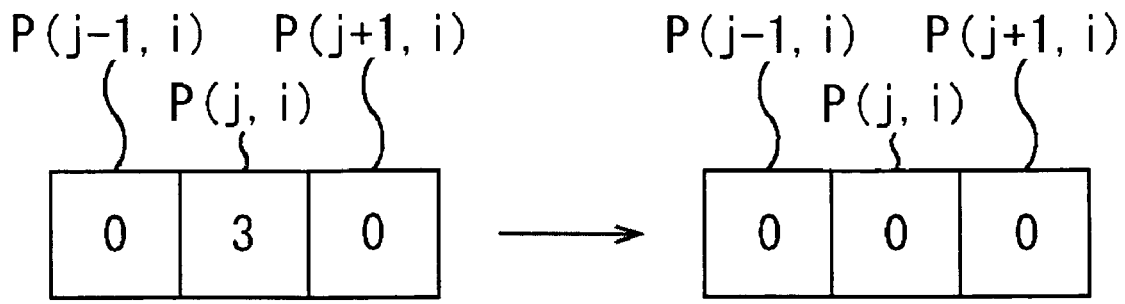
FIG. 8 is a diagram illustrating isolated point eliminating processing.
Figure 9:
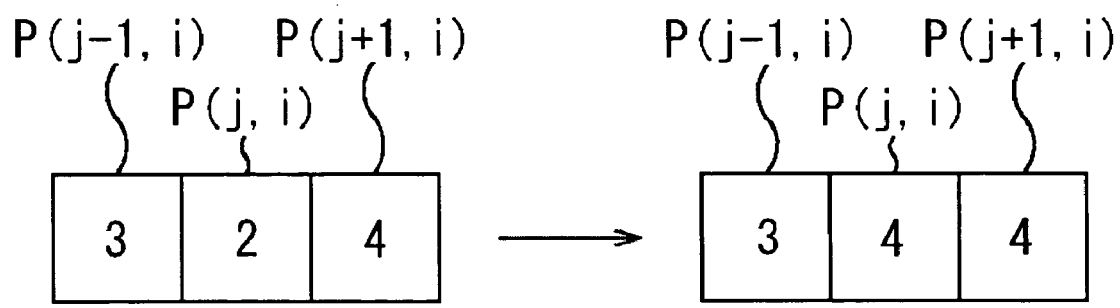
FIG. 9 is another diagram illustrating isolated point eliminating processing.
Figure 10:
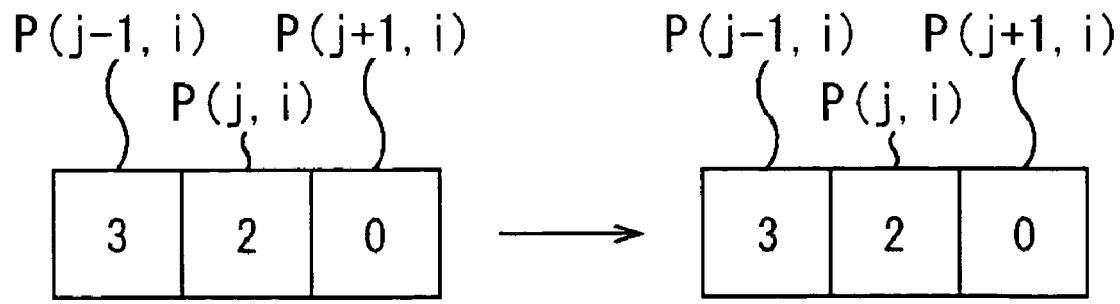
FIG. 10 is still another diagram illustrating isolated point eliminating processing.

For example, when two pixels adjacent each other in a horizontal direction with respect to a target pixel P(j, i) are taken as peripheral pixels P(j−1, i) and P(j+1, i), respectively, the index of value 3 of the target pixel P(j, i), as shown on the left side in FIG. 8, is converted to value 0, as shown on the right side in FIG. 8, because both of the indexes of the peripheral pixels P(j−1, i) and P(j+1, i) have value 0. The index of value 2 of a target pixel P(j, i), as shown on the left side in FIG. 9, is converted to a maximum value (value 4) in the indexes of peripheral pixels P(j−1, i) and P(j+1, i), as shown on the right side in FIG. 9, because the indexes of these peripheral pixels have a value (value 3, value 4) other than value 0. The index of value 2 of a target pixel P(j, i), as shown on the left side in FIG. 10, retains its value as shown on the right side in FIG. 10, because there is one peripheral pixel P having an index of value 0. The letters "j" and "i" in the foregoing (j, i) indicate the x coordinate and the y coordinate, respectively.

The index of a target pixel, the value of which is converted or left as it is by the above-mentioned isolated point eliminating processing, is inputted to the mask processing section 65 (FIG. 6) as an output signal.

Figure 11:
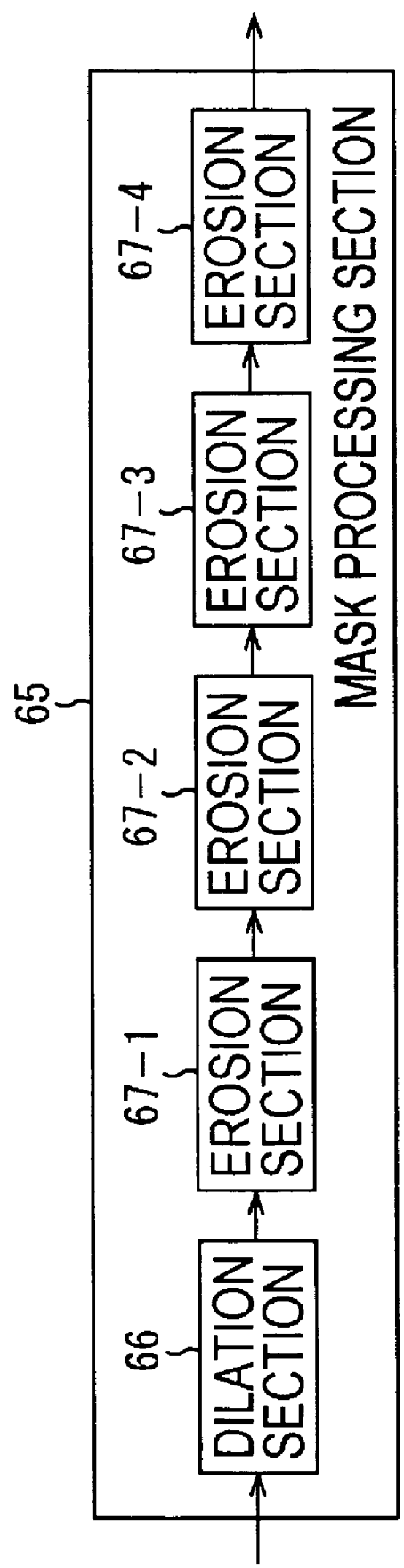
FIG. 11 is a block diagram showing an example of the configuration of a mask processing section in FIG. 6.

Referring to FIG. 11, the mask processing section 65 in this example consists of one dilation section 66 and four erosion sections 67-1 through 67-4 (hereinafter referred to simply as "erosion section 67", if there is no need to individually differentiate).

The dilation section 66 converts the index of a target pixel to a maximum value in the indexes of peripheral pixels, when there is one or more peripheral pixels Q, the index of which is not value 0. Further, the dilation section 66 leaves the index of a target pixel as it is, without converting, when all the indexes of peripheral pixels have value 0.

Figure 12:
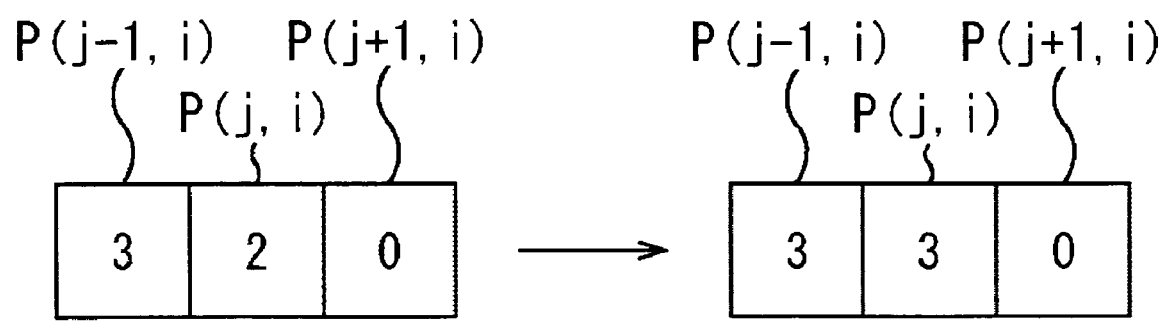
FIG. 12 is a diagram illustrating dilation processing.

For example, the index of value 2 of a target pixel P(j, i) that is shown on the left side in FIG. 12, is converted to a maximum value (value 3) in the indexes of peripheral pixels P(j−1, i) and P(j+1, i), as shown on the right side in FIG. 12, because there is the peripheral pixel P(j−1, i), the index of which is a value 3 other than value 0.

The index of a target pixel, the value of which is converted or retained unchanged by this dilation processing, is inputted to the erosion section 67-1.

The erosion sections 67-1 through 67-4 convert the index of a target pixel to value 0, when there is one or more peripheral pixels having an index of value 0, and do not convert the index of a target pixel when there is no peripheral pixel having an index of value 0.

Figure 13:
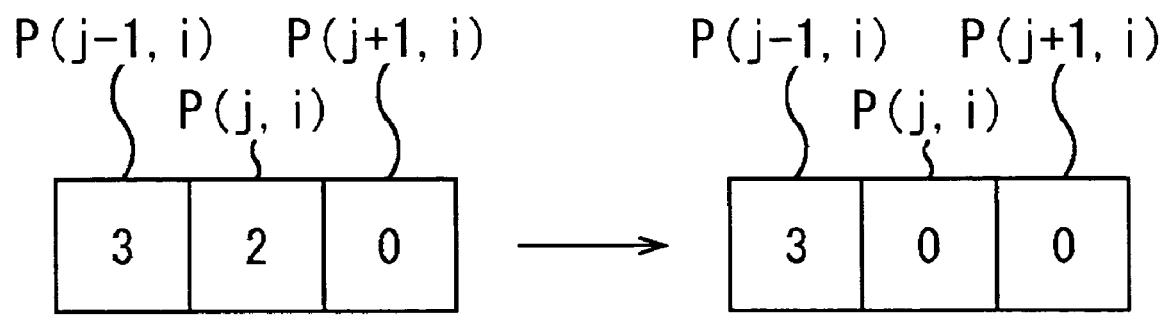
FIG. 13 is a diagram illustrating erosion processing.

For example, the index of value 2 of the target pixel P(j, i) that is shown on the left side in FIG. 13 is converted to value 0 that is shown on the right side in FIG. 13, because there is one peripheral pixel having an index of value 0.

The index of the target pixel, the value of which is converted or retained unchanged by this erosion processing, is inputted to the erosion section 67 of subsequent stage or the gain factor generating section 43 (FIG. 6).

Thus, to the high frequency region signal extracted by the filtering processing section 41, different index signals (masks) both as regards an image quality degrading portion and other portions are generated by the foregoing dilation processing and erosion processing (which are hereinafter generally referred to as "mask processing" in some cases).

The index signal from the mask processing section 65 of the mask generating section 42 is inputted to the gain factor generating section 43. Here, gain factor generating processing in the gain factor generating section 43 will be discussed below.

Figure 14:
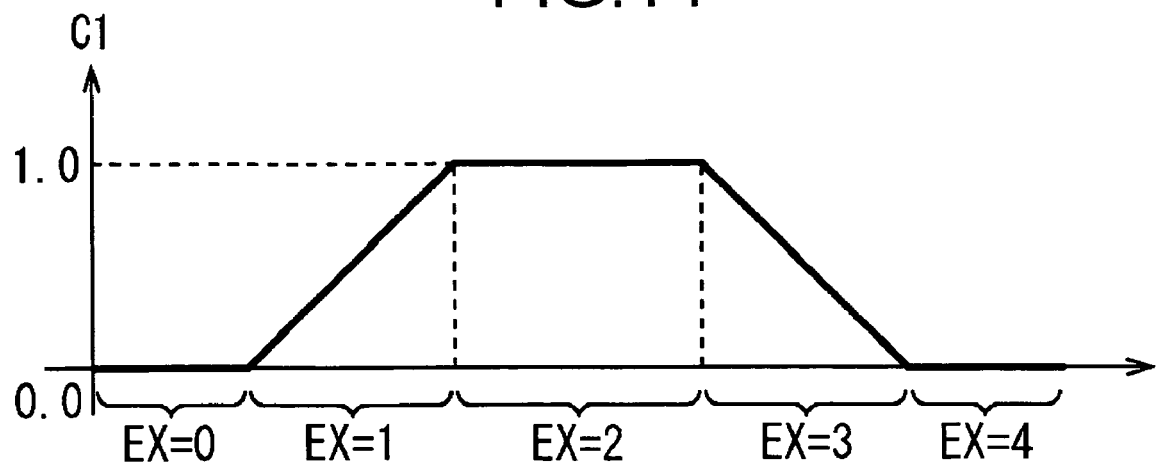
FIG. 14 is a diagram showing the relationship between index and gain factor C1.

Referring to FIG. 14, the gain factor generating section 43 first determines a gain factor C1 in accordance with a rule corresponding to index EX from the mask generating section 42 (mask processing section 65).

Concretely, when the index EX is value 0 or value 4, the gain factor C1 has value 0. When the index EX is value 1, the gain factor C1 has a value given by Equation (1). When the index EX is value 3, the gain factor C1 has a value given by Equation (2).

$$C1=(G43\text{-in-threshold } th0)/(\text{threshold } th1-\text{threshold } th0) \quad (1)$$

$$C1=1-(G43\text{-in-threshold } th2)/(\text{threshold } th3-\text{threshold } th2) \quad (2)$$

where G43-in is a signal inputted from the horizontal LPF 62 to the gain factor generating section 43, and thresholds th0 through th3 are the same threshold value as used in the threshold value processing section 63.

The gain factor generating section 43 multiplies the gain factor C1 so determined by a predetermined intensity factor C2 that is variable by a user, thereby generating a gain factor C3. That is, when index EX is a large value (e.g., value 4) or a small value (e.g., value 0) and expected as an image quality degrading component, the gain factor C3 has a small value (e.g., value 0). Therefore, multiplying in the multiplier 44 a high frequency region signal extracted in the filtering section 41 by the gain factor C3 enables to suppress (eliminate) the image quality degrading components of the high frequency region signal.

Next, the operation of the filtering section 41, mask generating section 42 and gain factor generating section 43 will be described with reference to FIG. 15 to FIG. 22.

Figure 15:
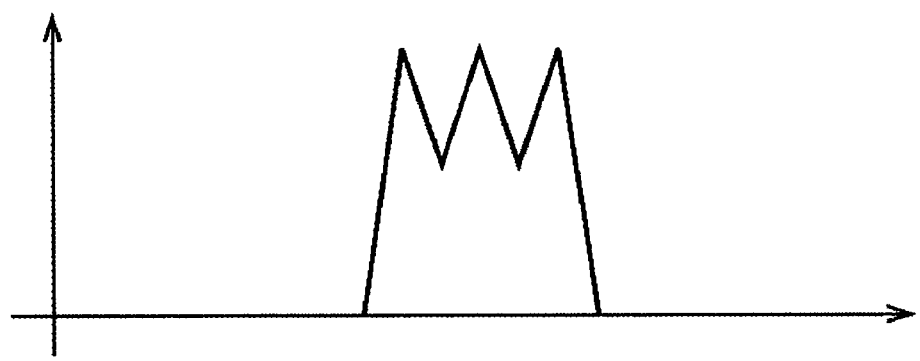
FIG. 15 is a diagram showing a waveform of an input video signal.
Figure 16:
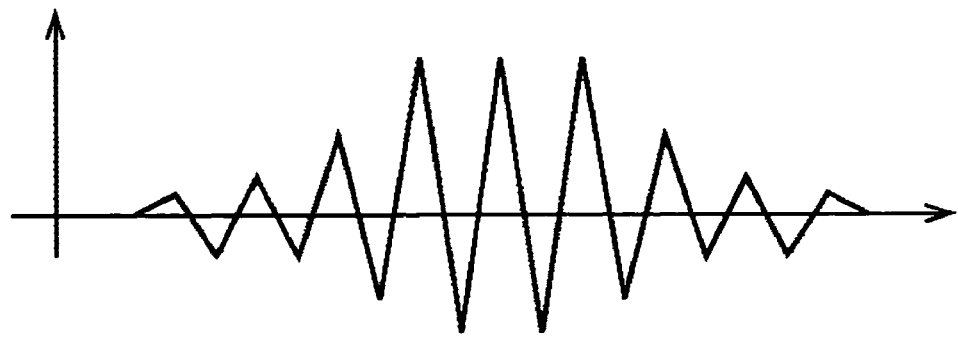
FIG. 16 is a diagram showing an output waveform of a horizontal BPF in FIG. 6.
Figure 17:
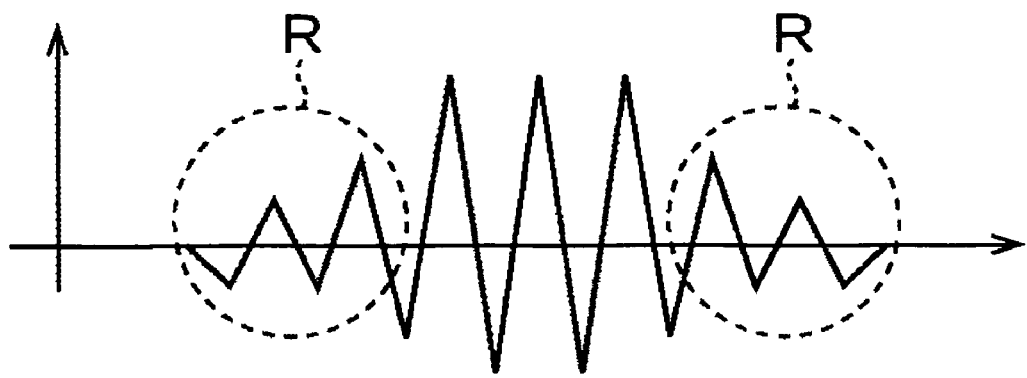
FIG. 17 is a diagram showing an output waveform of a coring section in FIG. 6.
Figure 18:
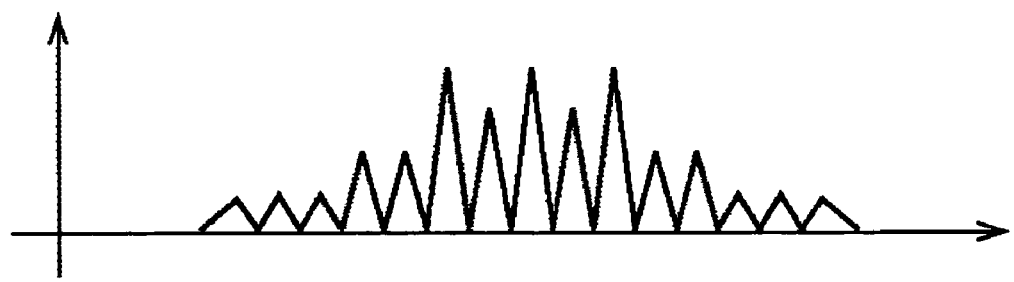
FIG. 18 is a diagram showing an output waveform of an absolute value processing section in FIG. 6.
Figure 19:
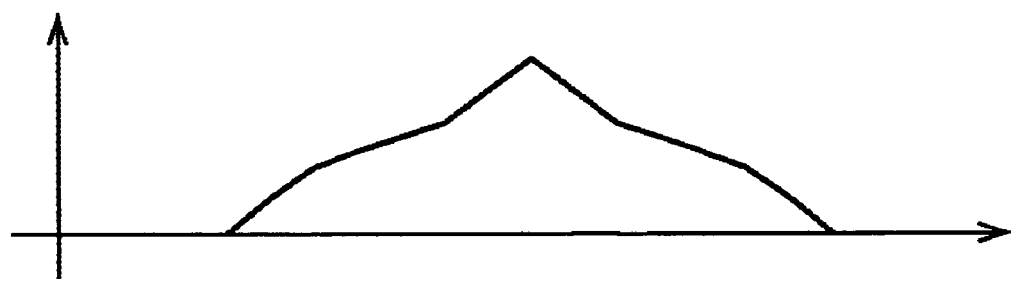
FIG. 19 is a diagram showing an output waveform of a horizontal LPF in FIG. 6.

A signal from the VLPF 11 as shown in FIG. 15 is subjected to horizontal band-pass filtering processing by the horizontal BPF 51 of the filtering section 41, and then converted to such a signal as shown in FIG. 16, and thereafter inputted to the coring section 52. A signal shown in FIG. 17 that is obtained by coring processing, namely, a high frequency region signal, is inputted to the mask generating section 42 and multiplier 44. This high frequency region signal contains image quality degrading components that are indicated by dotted circles R in FIG. 17. It is however capable of eliminating the image quality degrading components by generating the gain factor C3 depending on a mask generated by the mask generating section 42, and multiplying the high frequency region signal by the gain factor C3.

The signal (FIG. 17) inputted to the absolute value processing section 61 of the mask generating section 42 is converted there to a signal of an absolute value (FIG. 18), and then inputted to the horizontal LPF 62. Signal (FIG. 19) after being subjected to horizontal low pass filtering processing by the horizontal LPF 62 is inputted to the threshold value processing section 63 and gain factor generating section 43.

The threshold value processing section 63 compares the level of the signal (FIG. 19) inputted from the horizontal LPF 62 with four threshold values th0 through th3, as shown in FIG. 20A, and then converts it to an index signal made up of value 0 through value 4 (FIG. 20B). Note that index signals shown in FIGS. 20A to 20G have value 0 to value 2.

The index signal from the threshold value processing section 63 is subjected to isolated point elimination by the isolated point eliminating section 64, and then inputted to the mask processing section 65 where mask processing is performed. For example, the index signal shown in FIG. 20B is converted to that shown in FIG. 20C by dilation processing in the dilation section 66 of the mask generating section 65, followed by sequential erosion processing in the four erosion sections 67-1 through 67-4. As a result, the index signal is converted sequentially to the index signals shown in FIG. 20D through FIG. 20G.

The signal resulting from the processing in the mask processing section 65 (i.e., the signal from the erosion section 67-4) (FIG. 20G) is inputted to the gain factor generating section 43.

Figure 21A:
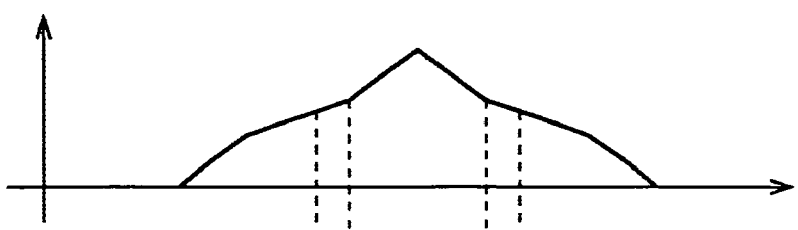
FIG. 21 is a diagram illustrating processing of generating a gain factor C3.
Figure 21B:
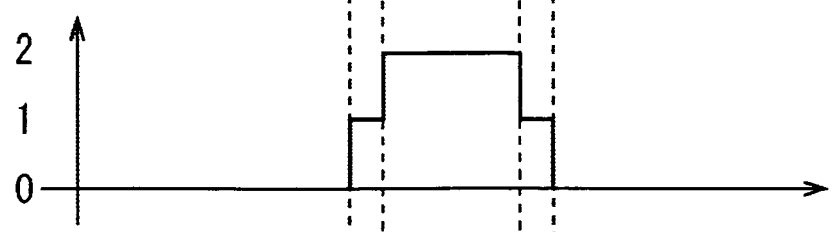
Figure 21C:
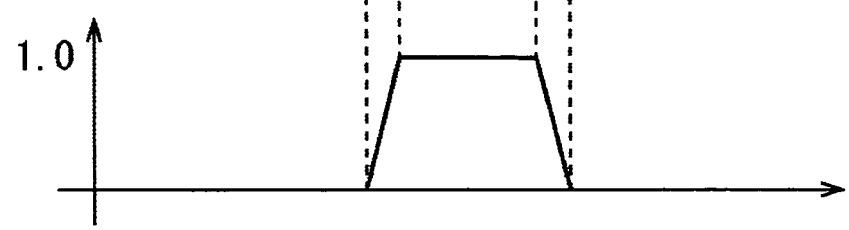

The gain factor generating section 43 determines the gain factor C1 in accordance with a rule corresponding to an index from the mask processing section 65 (FIG. 14, Equation (1), Equation (2)). From the index signal (mask) shown in FIG. 21B (=FIG. 20G), the gain factor C1 shown in FIG. 21C is found. FIG. 21A (=FIG. 19) illustrates the signal G43-in that is inputted from the horizontal LPF 62 to the gain factor generating section 43.

Figure 22A:
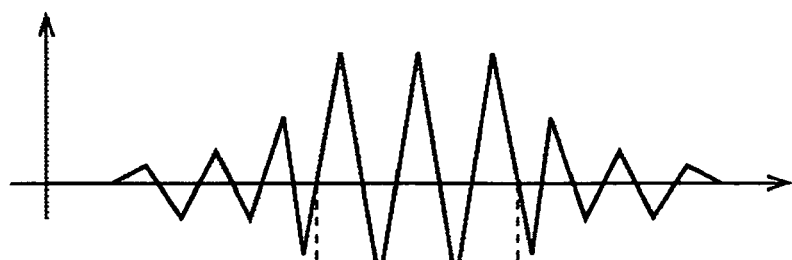
FIG. 22 is a diagram illustrating processing of correcting a luminance signal.
Figure 22B:
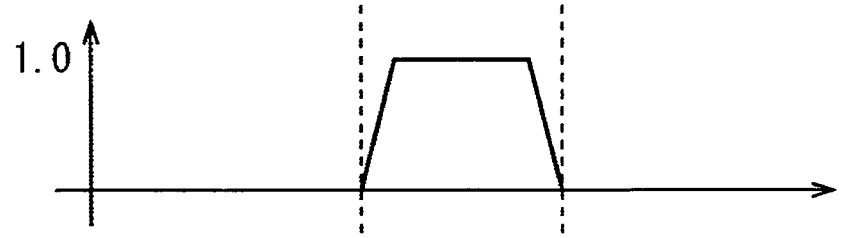
Figure 22C:
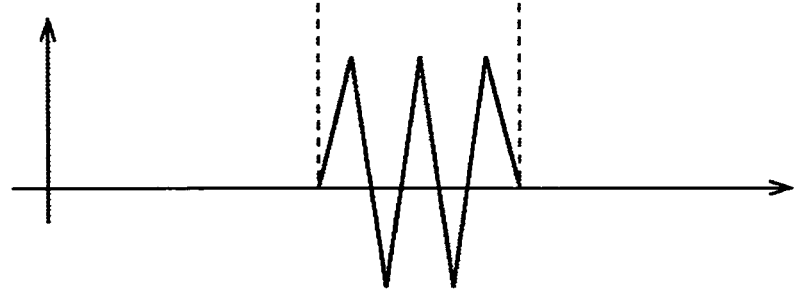

The gain factor generating section 43 calculates the gain factor C3 by multiplying the gain factor C1 shown in FIG. 21C by the intensity factor C2 set by a user, and then outputs the gain factor C3 to the multiplier 44. Specifically, the multiplier 44 multiplies a high frequency region signal extracted by the filtering section 41 shown in FIG. 22A (=FIG. 17) by the gain factor C3 that is obtained by multiplying the gain factor C1 in FIG. 22B (=FIG. 21C) by the intensity factor C2. This provides a high frequency region signal (horizontal contour correction signal) from which image quality degrading components (the portions indicated by the dotted circles R in FIG. 17) are eliminated, as shown in FIG. 22C.

Although in the foregoing the mask processing section 65 consists of one dilation section 66 and four erosion sections 67, the number of the dilation section 66 and erosion section 67 may be changed selectively depending on the video complexity in an input video image and the like.

FIG. 23 illustrates another example of the configuration of the signal processing apparatus 30, which is provided with a contour correction signal generating section 71 in place of the contour correction signal generating section 31 in FIG. 5. To the contour correction signal generating section 71, an input video signal is inputted together with the signal from the VLPF 11.

Figure 24:
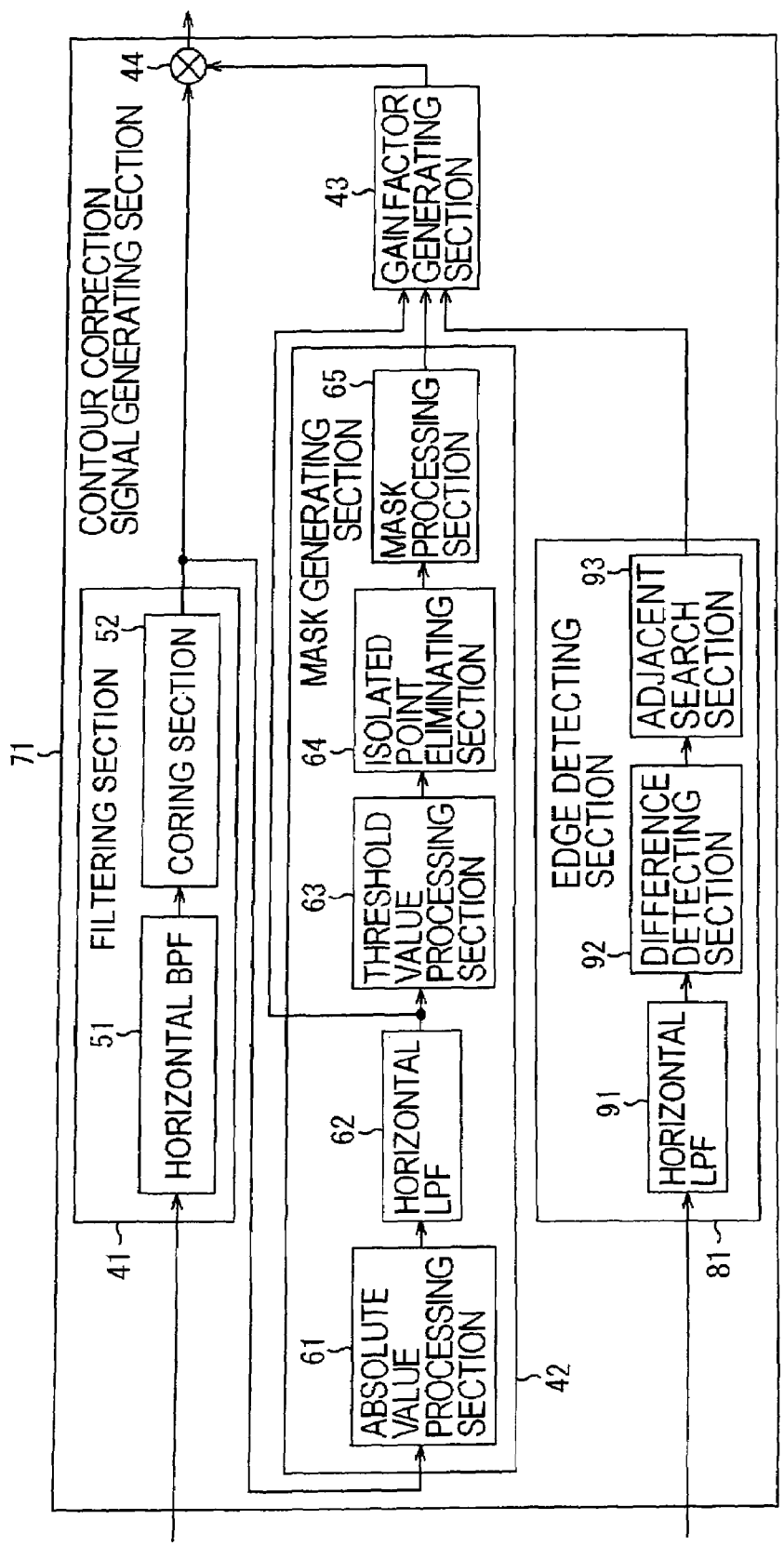
FIG. 24 is a block diagram showing an example of the configuration of a contour correction signal generating section in FIG. 23.

FIG. 24 illustrates an example of the configuration of the contour correction signal generating section 71, in which an edge detecting section 81 is added to the contour correction signal generating section 31 in FIG. 6.

An input video signal from a CCD camera is inputted to a horizontal LPF 91 of the edge detecting section 81. The horizontal LPF 91 performs horizontal low pass filtering processing of the input video signal and then outputs a resultant signal to a difference detecting section 92. The filtering factors of the horizontal LPF 91 are, for example, 0.5, and 0.5.

The difference detecting section 92 detects a horizontal difference value from a signal inputted from the horizontal LPF 91, and then outputs an adjacent search section 93 a value (a comparison result DR) that is based on a comparison result between the difference value and a predetermined threshold value.

Figures 25, 26:
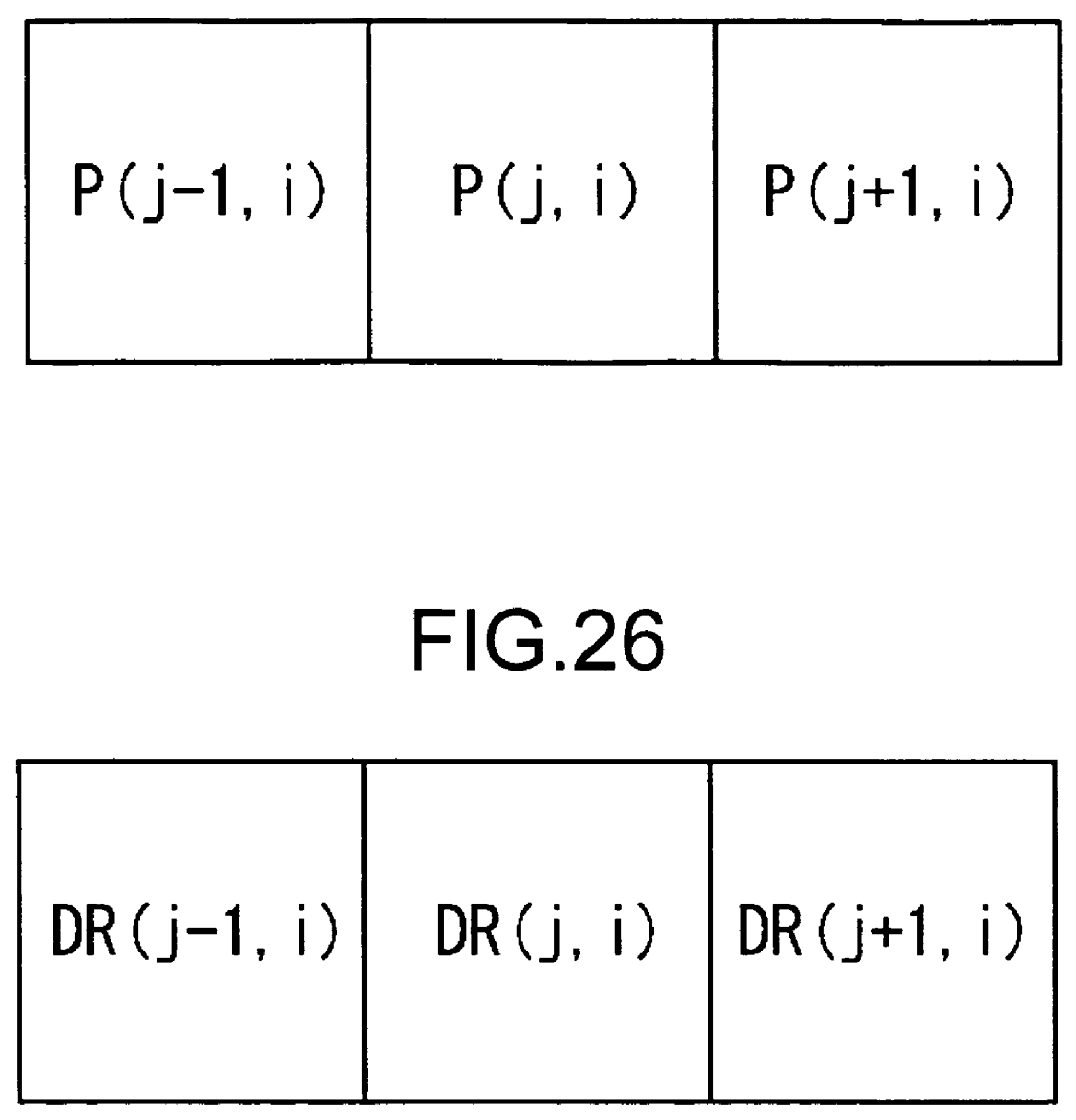

Concretely, as shown in FIG. 25, the following difference values d0, d1, and d2 are calculated with respect to two peripheral pixels P(j−1, i) and P(j+1, i) that are adjacent each other in a horizontal direction relative to the target pixel P(j, i).

Difference value $d0$=Pixel value of target pixel $P(j, i)$−Pixel value of peripheral pixel $P(j−1, i)$ Difference value $d1$=Pixel value of target pixel $P(j, i)$−Pixel value of peripheral pixel $P(j−1, i)$ Difference value $d2$=Pixel value of peripheral pixel $P(j−1, i)$−Pixel value of peripheral pixel $P(j+1, i)$ The difference detecting section 92 outputs value 1 as a comparison result DR(j, i) in the target pixel P(j, i), when one or more of the calculated difference values d0 through d2 are greater than a predetermined threshold value et (i.e., when any edge is expected to exist). Conversely, the difference detecting section 92 outputs value 0 when every difference value d is not more than the predetermined threshold value et (i.e., when any edge is not expected to exist).

The adjacent search section 93 judges whether an edge exists or not in a predetermined region containing the target pixel, by use of the comparison result DR from the difference detecting section 92. The adjacent search section 93 outputs the gain factor generating section 43 value 0 as a search result RR when the judgment result is that there is an edge, and outputs value 1 as the search result RR when the judgment result is that there is no edge.

It is now proposed to consider a specific example that the comparison result DR(j−1, i) of the pixel P(j−1, i), the comparison result DR(j, i) of the pixel P(j, i), and the comparison result DR(j+1, i) of the pixel P(j+1, i) supplied from the difference detecting section 92 are taken as one region, as shown in FIG. 26, and when one or more comparison results DR having value 1 exist in these comparison results DR (i.e., when any edge is expected to exist in that region), value 0 is outputted as an adjacent search result RR of the target pixel P(j, i). Conversely, when all the comparison results DR in that region have value 0 (i.e., when no edge is expected to exist in that region), value 1 is outputted as the adjacent search result RR of the target pixel P(j, i).

The gain factor generating section 43 determines the gain factor C1 in accordance with a rule corresponding to the index signal from the mask generating section 42 (FIG. 14, Equation (1), Equation (2)), and also calculates the gain factor C3 by multiplying the gain factor C1, the intensity factor C2, and an output from the edge detecting section 81 (i.e., the adjacent search result RR). That is, when an edge exists in a predetermined region containing the target pixel P(j, i), the adjacent search result RR has value 0, and therefore the gain factor C3 is value 0. As the result, the enhancement intensity of an edge peripheral portion becomes zero, thereby suppressing ringing that occurs in the edge peripheral portion.

Figure 27:
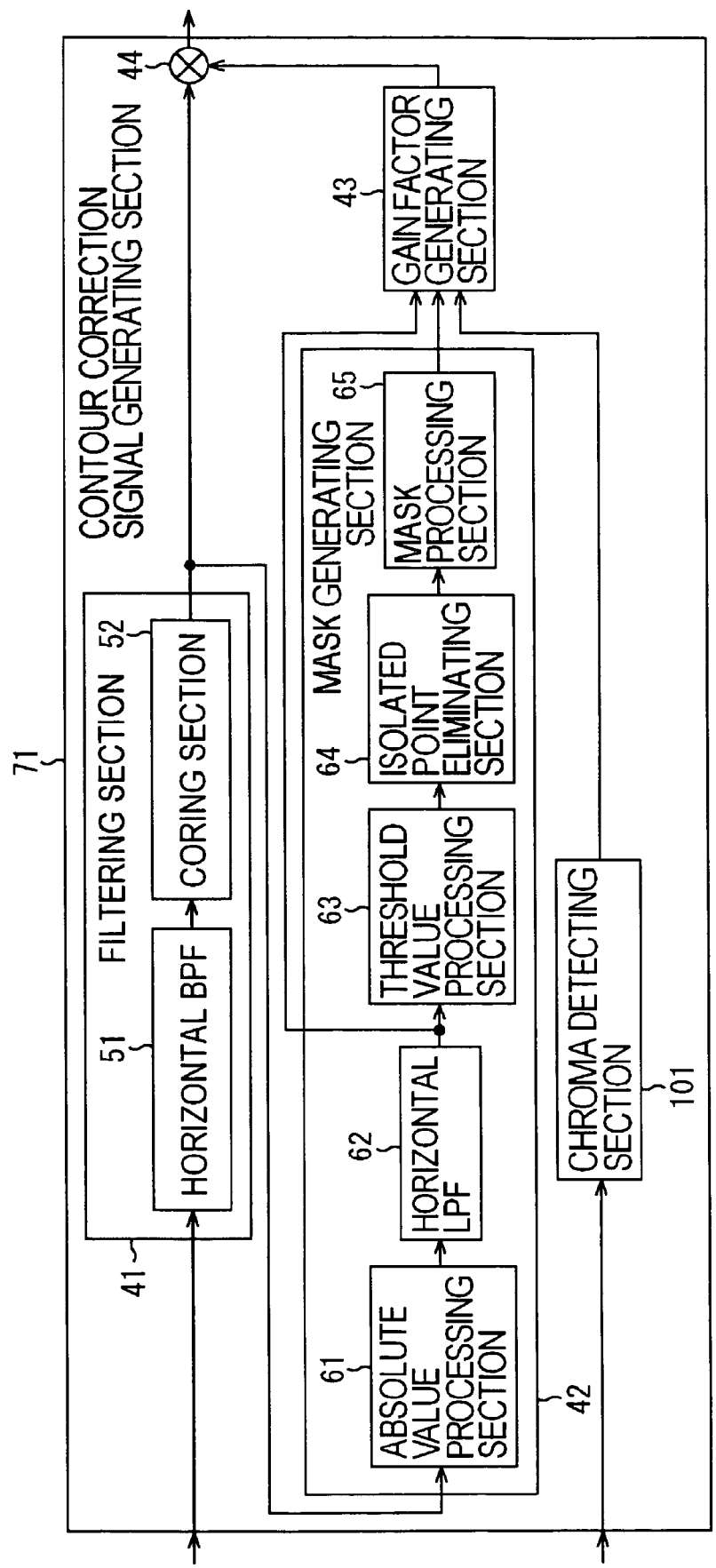
FIG. 27 is a block diagram showing another example of the configuration of the contour correction signal generating section in FIG. 23.

FIG. 27 illustrates other example of the configuration of the contour correction signal generating section 71 in FIG. 23, in which a chroma detecting section 101 is added to the contour correction signal generating section 31 in FIG. 6.

The chroma detecting section 101 detects chroma components from an input video signal that is inputted from a CCD camera.

Figures 28, 29:
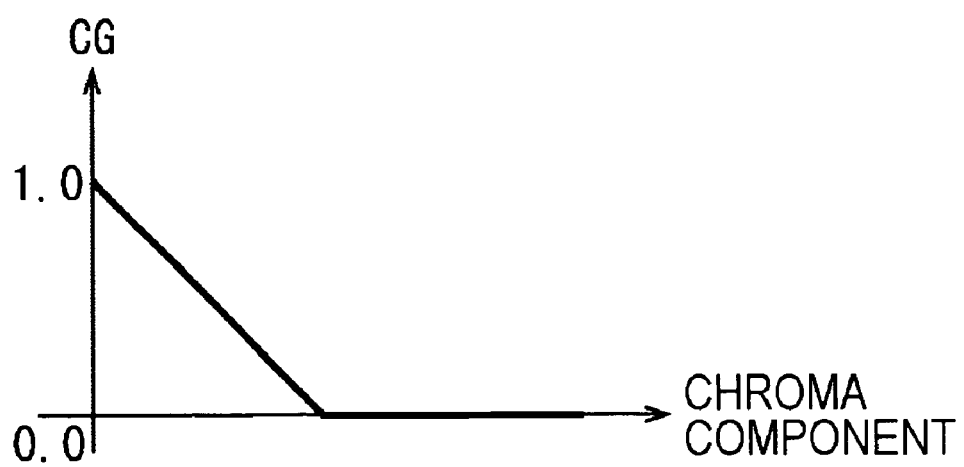
FIG. 28 is a diagram illustrating chroma detecting processing.
FIG. 29 is a diagram illustrating a method of determining a gain factor CG.

Specifically, as shown in FIG. 28, the chroma detecting section 101 calculates by Equation (3) a difference value d between a target pixel P(j, i) and eight peripheral pixels P(j, i−1), P(j+1, i−1), P(j+2, i−1), P(j+1, i), P(j+2, i), P(j, i+1), P(j+1, i+1), and P(j+2, i+1) which are in a predetermined positional relationship with the target pixel P(j, i).

Difference value $d(j, i−1)=|P(j, i−1)−P(j+1, i−1)|$

Difference value $d(j+1, i−1)=|P(j+1, i−1)−P(j+2, i−1)|$

Difference value $d(j, i)=|P(j, i)−P(j+1, i)|$

Difference value $d(j+1, i)=|P(j+1, i)−P(j+2, i)|$

Difference value $d(j, I+1)=|P(j, i+1)−P(j+1, i+1)|$

Difference value $d(j+1, I+1)=|P(j+1, i+1)−P(j+2, i+1)|$ (3)

The chroma detecting section 101 then outputs the gain factor generating section 43 a maximum value in the calculated difference values d, as a chroma component of the target pixel P(j, i).

The gain factor generating section 43 detects a gain factor CG, as shown in FIG. 29, which corresponds to the magnitude of the chroma component inputted from the chroma detecting section 101. That is, the gain factor CG has a small value when the chroma component is large (when a video image is of chromatic color portion), and has a great value when the chroma component is small (when the video image is of achromatic color portion).

The gain factor generating section 43 determines a gain factor C1 in accordance with a rule corresponding to an index from the mask generating section 42 (FIG. 14, Equation (1), Equation (2)), and also calculates the gain factor C3 by multiplying the gain factor C1, the intensity factor C2, and the gain factor CG. That is, since the gain factor C3 regarding the achromatic color portion is allowed to have a great value, the achromatic color portion having a high horizontal resolution can be generated at a high resolution.

FIG. 30 illustrate another example of the configuration of the contour correction signal generating section 71 in FIG. 23, in which the edge detecting section 81 shown in FIG. 24 and the chroma detecting section 101 shown in FIG. 27 are added to the contour correction signal generating section 31 in FIG. 6.

Specifically, the gain factor generating section 43 determines the gain factor C1 in accordance with a rule corresponding to an index signal from the mask generating section 42, and also calculates the gain factor C3 by multiplying the gain factor C1, the intensity factor C2, an adjacent search result RR from the edge detecting section 81, and the gain factor CG. This case therefore suppresses ringing that occurs in an edge peripheral portion and also generates an achromatic color portion at a high resolution.

The foregoing sequence of processing can be implemented by hardware, as well as software. In the case of implementing the sequence of processing by software, a program constituting the software is installed on a computer, and the program is executed on the computer, so that the above-mentioned processing is implemented functionally.

FIG. 31 is a block diagram showing the configuration of one preferred embodiment of a computer functioning as the above-mentioned horizontal contour correction signal generating sections 31, 71. An I/O (input/output) interface 116 is connected via a bus 15 to a CPU (center processing unit) 111. When a user inputs an instruction through an input section 118 made up of a keyboard, mouse and the like to the CPU 111 via the I/O interface 116, the CPU loads on a RAM (random access memory) 113 a program stored in a record medium such as a magnetic disk 131, optical disk 132, magneto-optical disk 133, or semiconductor memory 134, which is mounted on a ROM (read only memory) 112, hard disk 114, or drive 120, and then executes the program to perform a variety of processing as described above. The CPU 111 also outputs the processing results as required, via the I/O interface 116, to an output section 117 made up of an LCD (liquid crystal display). In an alternative, a program may be previously stored in the hard disk 114 or ROM 112, in order to provide users with the program integrally with the computer 101. In other alternative, the program may be provided as package media of the magnetic disk 131, optical disk 132, magneto-optical disk 133, or semiconductor memory 134. In still other alternative, the program may be provided to the hard disk 114 via a communication section 119 from a satellite, network or the like.

In the present specification, the step of describing a program supplied from a record medium may of course include processing executed in time series in the order described, also include processing that is not always executed in time series and may be executed in parallel or separately.

What is claimed is:

1. A signal processing apparatus comprising:
    a generator configured to generate a luminance signal of an input video signal;
    an extractor configured to extract a high frequency signal from said input video signal, and including a first bandpass filter connected to a coring circuit configured to output said high frequency signal;
    a mask generator configured to generate a mask by masking image quality degrading components contained in said high frequency signal, and including an absolute value calculator connected to a low pass filter connected to a threshold processor connected to a point eliminator connected to a mask processor configured to output said mask, the low pass filter configured to output a low passed signal;
    a gain factor generator configured to generate a gain factor based on two separate inputs, said two separate inputs being said mask and said low passed signal; a contour correction signal generator configured to generate a contour correction signal by multiplying said high frequency signal by said gain factor; and
    a luminance corrector configured to correct said luminance signal based on said contour correction signal.

2. The signal processing apparatus according to claim 1, wherein:
    said mask generator is configured to generate said mask by repeating an arbitrary number of times dilation processing or erosion processing for said high frequency signal.

3. The signal processing apparatus according to claim 1, further comprising:
    a detector configured to detect either or both of an edge component and chroma component from said input video signal, wherein:
    said gain factor generator is configured to control an enhanced amount of either or both of said edge component and said chroma component.

4. A signal processing method comprising the steps of:
    generating a luminance signal of an input video signal;
    extracting a high frequency signal from said input video signal, including bandpass filtering and coring the input video signal, and outputting said high frequency signal;
    generating a mask by masking image quality degrading components contained in said high frequency signal, including calculating an absolute value of the high frequency signal, low pass filtering the absolute value, processing a threshold of the low pass filtered absolute value to generate a processed signal, eliminating a point in the processed signal and outputting said mask;
    generating a gain factor based on two separate inputs, said two separate inputs being said mask and said low passed filtered absolute value;
    generating a contour correction signal by multiplying said high frequency signal by said gain factor; and
    correcting said luminance signal based on said contour correction signal.

5. A computer readable storage medium storing a computer readable program configured to cause a processor-based device to execute a method comprising:
    generating a luminance signal of an input video signal;
    extracting a high frequency signal from said input video signal, including bandpass filtering and coring the input video signal, and outputting said high frequency signal;
    generating a mask by masking image quality degrading components contained in said high frequency signal, including calculating an absolute value of the high frequency signal, low pass filtering the absolute value, processing a threshold of the low pass filtered absolute value to generate a processed signal, eliminating a point in the processed signal and outputting said mask;
    generating a gain factor based on two separate inputs, said two separate inputs being said mask and said low passed filtered absolute value;
    generating a contour correction signal by multiplying said high frequency signal by said gain factor; and
    correcting said luminance signal based on said contour correction signal.

* * * * *